United States Patent
Liu et al.

(10) Patent No.: US 9,438,679 B2
(45) Date of Patent: Sep. 6, 2016

(54) METHOD, APPARATUS, NAME SERVER AND SYSTEM FOR ESTABLISHING FCOE COMMUNICATION CONNECTION

(75) Inventors: Lifeng Liu, Beijing (CN); Jian Meng, Beijing (CN); Yuchen Wang, Beijing (CN); Michael Ko, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 742 days.

(21) Appl. No.: 13/808,890

(22) PCT Filed: Mar. 10, 2011

(86) PCT No.: PCT/CN2011/071662
§ 371 (c)(1),
(2), (4) Date: Mar. 14, 2014

(87) PCT Pub. No.: WO2011/120370
PCT Pub. Date: Oct. 6, 2011

(65) Prior Publication Data
US 2014/0359137 A1 Dec. 4, 2014

(30) Foreign Application Priority Data
Mar. 31, 2010 (CN) .......................... 2010 1 0139078

(51) Int. Cl.
*H04L 29/08* (2006.01)
*H04L 29/12* (2006.01)

(52) U.S. Cl.
CPC ............ *H04L 67/141* (2013.01); *H04L 67/16* (2013.01); *H04L 69/324* (2013.01); *H04L 61/103* (2013.01); *H04L 61/6022* (2013.01); *H04L 61/6045* (2013.01); *H04L 67/1097* (2013.01)

(58) Field of Classification Search
CPC ........... H04L 49/356–49/358; H04L 61/6045; H04L 67/16; H04L 67/1097
See application file for complete search history.

(56) References Cited

U.S. PATENT DOCUMENTS

2003/0212781 A1* 11/2003 Kaneda ............. H04L 29/12254
709/223
2005/0097234 A1  5/2005  Douglas et al.
(Continued)

FOREIGN PATENT DOCUMENTS

| CN | 1620069 A | 5/2005 |
| CN | 1773998 A | 5/2006 |
| CN | 101557417 A | 10/2009 |

OTHER PUBLICATIONS

1st Office Action in corresponding Chinese Patent Application No. 201010208035.6 (Jul. 3, 2013).
(Continued)

*Primary Examiner* — Brendan Higa
(74) *Attorney, Agent, or Firm* — Leydig, Voit & Mayer, Ltd.

(57) ABSTRACT

Embodiments of the present invention disclose a method, an apparatus, and a system for establishing an FCoE communication connection and a name server. According to a WWN world wide name identifier of a target to be accessed, a destination MAC address used to access the target to be accessed is acquired. According to the destination MAC address, a login operation is performed for the target to be accessed, to establish an FCoE fiber channel over Ethernet communication connection, so that an FCoE initiator may directly establish a communication connection with an FCoE target, thereby reducing data transmission delay and lightening the processing load of an original FCoE forwarder.

8 Claims, 10 Drawing Sheets

(56) References Cited

U.S. PATENT DOCUMENTS

| | | | |
|---|---|---|---|
| 2006/0101211 A1 | 5/2006 | Baldwin et al. | |
| 2009/0252181 A1* | 10/2009 | Desanti | H04L 41/12 370/474 |
| 2009/0254640 A1* | 10/2009 | Otani | G06F 3/0605 709/221 |
| 2011/0032933 A1* | 2/2011 | Eisenhauer | H04L 12/4633 370/389 |
| 2011/0051733 A1* | 3/2011 | Hirata | H04L 49/10 370/400 |
| 2011/0283026 A1 | 11/2011 | Otani | |

OTHER PUBLICATIONS

International Search Report in corresponding PCT Patent Application No. PCT/CN2011/071662 (Jun. 16, 2011).

Written Opinion of the International Searching Authority in corresponding PCT Patent Application No. PCT/CN2011/071662 (Jun. 16, 2011).

"Fibre Channel; Backbone-5 (FC-BB-5)," Working Draft, INCITS xxx-200x, T11/Project 1871-D/Rev 2.00, American National Standard for Information Technology (Jun. 4, 2009).

* cited by examiner

METHOD, APPARATUS, NAME SERVER AND SYSTEM FOR ESTABLISHING FCOE COMMUNICATION CONNECTION

This application claims priority to Chinese Patent Application No. 201010139078.3, filed with the Chinese Patent Office on Mar. 31, 2010 and entitled "METHOD, APPARATUS, NAME SERVER. AND SYSTEM FOR ESTABLISHING FCoE COMMUNICATION CONNECTION," which is incorporated herein by reference in its entirety.

FIELD OF THE INVENTION

The present invention relates to the communications field, and in particular, to a method, an apparatus, a name server and a system for establishing an FCoE communication connection.

BACKGROUND OF THE INVENTION

With continuous development of Internet applications, information and data that a network server needs to store become more and more, and as a result, the storage capacity required for the network server continuously increases. When the internal storage capacity of the network server cannot satisfy the demand for information increase, it is required to "externalize" the storage of the network server.

In order to solve this problem, storage area networks (Storage Area Networks, SAN) are proposed in the prior art, and the SAN provides a dedicated external storage environment for the network server, makes full use of new storage hardware technologies and network technologies, so as to satisfy demands for storage, access and backup of data of large capacity and high reliability.

A fiber channel (Fiber Channel, FC) is a protocol applied the most widely in the SAN, that is, data is transmitted based on an FC network in the SAN. However, there are a large number of switches, network interface cards, and cables required for implementing the FC network, and additionally, the cost of these devices is high, so that for the FC network, the device cost is high, the maintenance is difficult, and the scalability is bad. To solve the problem, the prior art uses the FCoE (Fiber Channel over Ethernet, fiber channel over Ethernet) protocol to bear the FC protocol on the basis of the Ethernet, so as to integrate the SAN and a local area network (LAN).

When most storage arrays in a data center are PC targets (FC Target), an FCoE initiator (FCoE Initiator) is connected to a lossless Ethernet (Lossless Ethernet), and PC data is transmitted to the FC SAN through an FCoE switch (FCoE Switch), so as to finally access the FC target. However, with the development of the FCoE standard, an FCoE target (FCoE Target) emerges, and an FCoE initiator may access an FCoE Target directly through a lossless Ethernet.

In the existing FC-BB-5 (Fiber Channel Backbone Generation 5) standard, the process that an FCoE initiator establishes a communication connection with an FC target is as follows:

Step A: When an FCoE initiator is initiated, a Discovery Solicitation (discovery solicitation) message is sent by taking a destination MAC address (Media Access Control address) as an All-FCF-MACs (All-FCF-MACs is a broadcast address defined in the protocol), and a Discovery Advertisement (discovery advertisement) message is transmitted back through an FCF, so as to acquire MAC addresses of all FCFs (FCoE Forwarder, FCoE forwarder) in the current network;

Step B: The FCoE initiator selects one of the FCFs to send an FLOGI (FABRIC LOGIN, fabric login) message;

Step C: After receiving the FLOGI message, the FCF may allocate an N_Port_ID (N port identifier) to the FCoE initiator, to use it as a unique identifier of the FCoE initiator in the PC network;

Step D: The FCF adds an FC-MAP (FCoE mapped MAC address, FCoE mapped MAC address) before the N_Port_ID to use it as a virtual MAC address of the FCoE initiator, and returns the virtual MAC address to the FCoE initiator through an PLOW LS_ACC (link acceptance) message, in which the virtual MAC address amounts to 48 bits, the most significant 24 bits are the FC-MAP, the least significant 24 bits are the N_Port_ID;

Step E: The FCoE initiator sends a PLOGI NS (Port Login Name Server, port login name server) message to the FCF, so that the FCF uses a WWN (World Wide Name, world wide name), on a Name Server (name server), of the FC target that the FCoE initiator is to access to find the N_Port_ID of the FC target in the network after query, and sends the N_Port_ID to the FCoE initiator through a PLOGI NS response message;

Step F: The FCoE initiator obtains the N_Port_ID; through the FCF, the FCoE initiator, to the FC target, sends a PLOGI (Port Login, port login) message to the FC target to be accessed, then the FC target returns a PLOGI ACC (port login acceptance) message, the port login is completed, and the FCoE initiator establishes communication with the FC target through the FCF.

In the prior art, according to the process specified in the FC-BB-5 the process that the FCoE initiator establishes a communication connection with the FCoE target is implemented. However, inventors find that, in the prior art, the FCoE initiator only learns the N_Port_ID of the FCoE target, and when the FCoE initiator communicates with the FCoE target, forwarding must be performed through the FCF, and due to the forwarding operation, so unnecessary transmitting delay is caused and the processing load of the FCF is also aggravated.

SUMMARY OF THE INVENTION

Embodiments of the present invention provide a method, an apparatus and a system for establishing an FCoE communication connection, so that an FCoE initiator may directly establish a communication connection with an FCoE target, thereby reducing data transmission delay, and lightening the processing load of an original FCoE forwarder.

The objective of the embodiments of the present invention is achieved by the following technical solutions:

A method for establishing an FCoE communication connection includes:

according to a WWN world wide name identifier of a target to be accessed, acquiring a destination MAC address used to access the target to be accessed; and according to the destination MAC address, performing a login operation for the target to be accessed, so as to establish an FCoE fiber channel over Ethernet communication connection.

A method for establishing an FCoE communication connection includes:

sending a name server query message, in which the name server query message carries a WWN identifier of a target to be accessed; receiving a name server query answer message, in which the name server query answer message carries an N_Port_ID of the target to be accessed and a destination MAC address of the target to be accessed, and the MAC address of the target to be accessed includes: a virtual MAC address generated from a specific network prefix and the N_Port_ID, or an actual MAC address; or sending a discovery solicitation message, in which the discovery solicitation message carries a WWN of a target to be accessed; receiving a discovery solicitation answer message, in which the discovery solicitation answer message carries an N_Port_ID of the target to be accessed and a destination MAC address of the target to be accessed, and the MAC address of the target to be accessed includes: a virtual MAC address generated from a specific network prefix and the N_Port_ID, or an actual MAC address; and according to the MAC address of the target to be accessed, performing a login operation for the target to be accessed, so as to establish an FCoE fiber channel over Ethernet communication connection.

A method for establishing an FCoE communication connection includes:

receiving a login operation request from an FCoE initiator;

according to the login operation request, establishing an FCoE communication connection with the FCoE initiator; and receiving a discovery solicitation message from the FCoE initiator; and sending a second discovery advertisement message to the FCoE initiator, so as to respond to the discovery solicitation message, in which the second discovery advertisement message carries a local MAC address and a local WWN identifier, the carried local MAC address is a virtual MAC address or an actual MAC address, and the virtual MAC address is composed of a specific network prefix and an N_Port_ID.

A method for establishing an FCoE communication connection includes:

receiving a PLOGI NS message from an FCoE initiator, in which the PLOGI NS message carries a WWN identifier of a target to be accessed;

according to the WWN identifier, querying an N_Port_ID of the target to be accessed; and sending a PLOG NS answer message, in which the PLOGI NS answer message carries the N_Port_ID, so that the initiator obtains the N_Port_ID of the target to be accessed.

An apparatus for establishing an FCoE communication connection includes:

an address acquiring module, configured to, according to a WWN world wide name identifier of a target to be accessed, acquire a destination MAC address used to access the target to be accessed; and a connection establishing module, configured to, according to the destination MAC address acquired by the address acquiring module, perform a login operation for the target to be accessed, so as to establish an FCoE fiber channel over Ethernet communication connection.

An apparatus for establishing an FCoE communication connection includes:

a request receiving module, configured to receive a login operation request from an FCoE initiator;

a request processing module, configured to, according to the login operation request received by the request receiving module, establish an FCoE communication connection with the FCoE initiator; and a first device address information advertisement module, configured to receive a discovery solicitation message from the FCoE initiator; and send a second discovery advertisement message to the FCoE initiator, so as to respond to the discovery solicitation message, in which the second discovery advertisement message carries a local MAC address and a local WWN identifier, the carried local MAC address is a virtual MAC address or an actual MAC address, and the virtual MAC address is composed of a specific network prefix and an N_Port_ID.

A name server includes:

a receiving module, configured to receive a PLOGI NS message from an FCoE initiator, in which the PLOGI NS message carries a WWN identifier of a target to be accessed;

a port identifier query module, configured to, according to the WWN identifier received by the receiving module, query an N_Port_ID of the target to be accessed; and a sending module, configured to send a first PLOG NS answer message, in which the first PLOGI NS answer message carries the N_Port_ID queried by the port identifier query module, so that the :FCoE initiator obtains the N_Port_ID of the target to be accessed.

A system for establishing an FCoE communication connection includes:

at least one apparatus for establishing an FCoE communication connection according to the above embodiment; and at least one apparatus for establishing an FCoE communication connection according to the above embodiment or at least one name server according to the above embodiment.

In the embodiments of the present invention, according to the WWN world wide name identifier of the target to be accessed, the type of the target to be accessed is determined, and the type of the target to be accessed includes: the FCoE fiber channel over Ethernet target or the FC fiber channel target. When the type of the target to be accessed is an FCoE target, a login operation is performed for the target to be accessed according to the MAC media access control address of the target to be accessed. When the type of the target to be accessed is an FC target, a login operation is performed for the target to be accessed according to the MAC address of FCoE forwarder fiber channel over Ethernet forwarder, so that the FCoE initiator may directly establish a communication connection with the FCoE target, thereby reducing data transmission delay and lightening the processing load of an original FCoE forwarder.

BRIEF DESCRIPTION OF THE DRAWINGS

To illustrate the technical solutions in the embodiments of the present invention or in the prior art more clearly, the following briefly describes the accompanying drawings required for describing the embodiments or the prior art. Apparently, the accompanying drawings in the following description merely show some embodiments of the present invention, and persons of ordinary skill in the art can derive other drawings from these accompanying drawings without creative efforts.

DETAILED DESCRIPTION OF THE EMBODIMENTS

The following clearly and completely describes the technical solutions according to the embodiments of the present invention with reference to the accompanying drawings in the embodiments of the present invention, Apparently, the embodiments in the following description are merely a part rather than all of the embodiments of the present invention. All other embodiments obtained by persons of ordinary skill in the art based on the embodiments of the present invention without creative efforts shall fall within the protection scope of the present invention.

Figure 1:
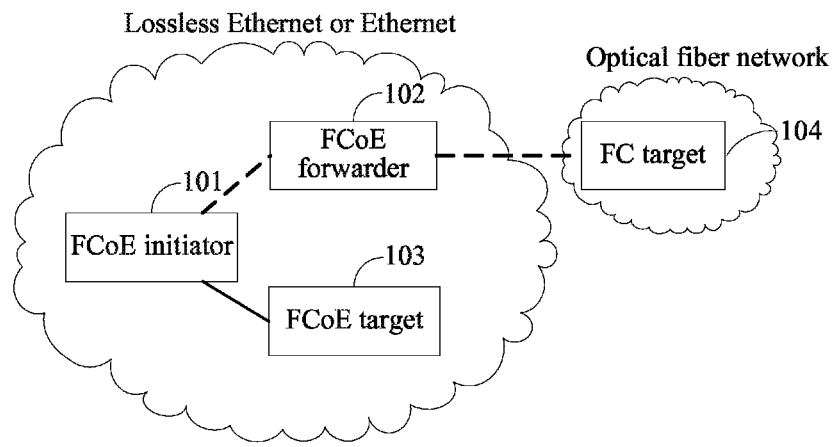
FIG. 1 is a schematic structural diagram of networking according to an embodiment of the present invention.
Figure 2:
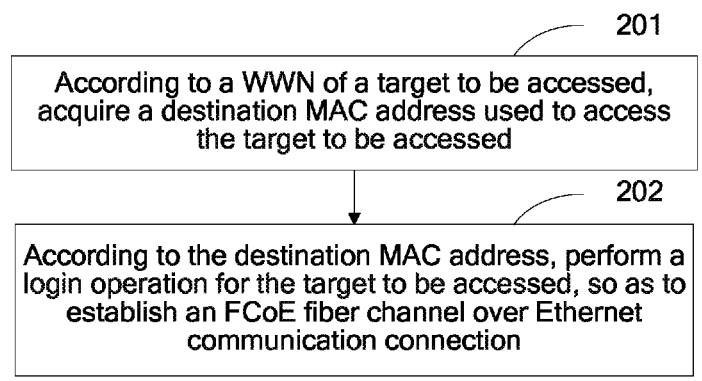
FIG. 2 is a flowchart of a method for establishing an FCoE communication connection according to Embodiment 1 of the present invention.

For ease of illustration, a specific embodiment of the present invention is introduced below. As shown in FIG. 1, it is a schematic diagram of networking according to an embodiment of the present invention, in the drawing, the networking includes: an FCoE initiator 101, an FCoE forwarder 102, an FCoE target 103, and an PC target 104, where the FCoE initiator 101, the FCoE forwarder 102, and the FCoE target 103 are all located in a lossless Ethernet or an Ethernet, and the FC target 104 is located in a fiber network. The FCoE initiator 101 is configured to initiate a data access operation to the FCoE target 103 and/or the FC target 104, the FCoE target 103 and the FC target 104 may be a storage array for storing data, the FCoE forwarder 102 is responsible for establishing an FCoE communication connection and allocating a MAC address and an N_Port_ID, and a dashed line and a solid line each denote an FCoE communication connection.

The network entity of the above drawing is taken as an example below, and several common standard operations in the embodiment are first briefly introduced:

FLOGI (Fabric Login, fabric login) operation—an operation of connecting to an FCoE forwarder or FCoE target. For example, the specific process that the FCoE initiator 101 initiates an FLOGI operation to the FCoE target 103 is as follows:

The FCoE initiator 101 sends an FLOGI message to the FCoE forwarder 102, and when accepting login, the FCoE forwarder 102 allocates an N_Port_ID(N port identifier) to the FCoE initiator 101, and transmits the N_Port_ID back to the FCoE initiator 101 through an LS_ACC (link. service acceptance) message; when the FCoE forwarder 102 does not accept the login, the FCoE forwarder 102 sends an LS_RJT (link service rejection) message to the FCoE initiator 101 to indicate login failure.

PLOGI NS (Port Login Name Server, port login name server) operation—an operation of sending a request operation to a name server according to a WWN (World Wide Name, world wide name), so as to acquire an N_Port_ID(N port identifier) corresponding to the WWN. For example, the specific process that the FCoE initiator 101 initiates a PLOGI NS operation to the FCoE forwarder 102 is as follows:

The FCoE initiator 101 sends a PLOGI NS message to the FCoE forwarder 102, where the PLOGI NS message carries the WWN of the target to be accessed by the FCoE initiator 101; the FCoE forwarder 102 finds, according to the WWN, the N_Port_ID of the target to be accessed by the FCoE initiator 101 on a name server after query, and transmits the N_Port_ID back to the FCoE initiator 101 through a PLOGI NS response message.

PLOGI (Port Login, port login) operation—the FCoE initiator logs in the port of the FCoE target, and through the login procedure, the FCoE initiator establishes an FCoE communication connection with the FCoE target; or, the FCoE initiator logs in the port of the FC target, and through the login procedure, the FCoE initiator establishes an FCoE communication connection with the FC target. For example, the specific process that the FCoE initiator 101 initiates a PLOGI operation to the FCoE target 103 is as follows:

The FCoE initiator 101 sends a PLOGI message to the FCoE target 103, so as to log in the port of the FCoE target 103, and when the FCoE target 103 accepts the login, the FCoE target 103 transmits a PLOGI ACC (port login acceptance) message back to the FCoE initiator 101, so as to indicate that the FCoE communication connection between the FCoE initiator 101 and the FCoE target 103 is established; when the FCoE target 103 does not accept the login, the FCoE target 103 transmits an LS_RJT (link service rejection) message back to the FCoE initiator 101, so as to indicate that the FCoE communication connection between the FCoE initiator 101 and the FCoE target 103 is established unsuccessfully.

In this embodiment, when the FCoE initiator 101 accesses the FCoE target 103 and/or the FC target 104, it is required to first establish an FCoE connection. By taking the FCoE initiator 101 as an example below, the process of establishing an FCoE communication connection is introduced in detail:

Embodiment 1 of the present invention provides a method for establishing an FCoE communication connection, and as shown in FIG. 1, the method process includes:

Step 201: According to a WWN world wide name identifier of a target to be accessed, acquire a destination MAC address used to access the target to be accessed.

The FCoE initiator 101 may access the FCoE target 103 or the EC target 104 through the destination MAC address.

Step 202: According to the destination MAC address, perform a login operation for the target to be accessed, so as to establish an FCoE fiber channel over Ethernet communication connection.

When the FCoE target 103 is accessed, the FCoE communication connection as shown by the solid line in FIG. 1 is established; when the FC target 104 is accessed, the FCoE communication connection as shown by the dashed line in FIG. 1 is established.

According to a WWN world wide name identifier of a target to be accessed, a destination MAC address used to access the target to be accessed is acquired. According to the destination MAC address, a login operation is performed for the target to be accessed, so as to establish an FCoE fiber channel over Ethernet communication connection, so that the FCoE initiator may directly establish a communication connection with the FCoE target, so as to reduce data transmission delay and lighten the processing load of an original FCoE forwarder.

Figure 3:
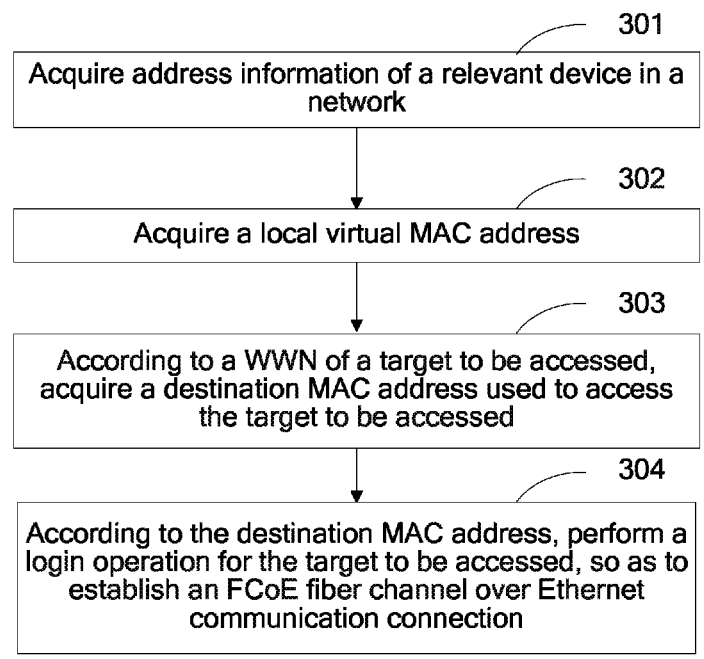
FIG. 3 is a flowchart of a method for establishing an FCoE communication connection according to Embodiment 2 of the present invention.

In the foregoing embodiment, before step 201, an operation of acquiring address information of a relevant device in a network (for example, the MAC address of the FCoE target 103 and of the FCoE forwarder 102) and acquiring a local MAC address (namely, the MAC address of the FCoE initiator 101) may be further included. FIG. 3 shows a method for establishing an FCoE communication connection according to Embodiment 2 of the present invention, which includes:

Step 301: Acquire address information of a relevant device in a network.

This step may specifically include: sending a discovery solicitation message; receiving a first discovery advertisement message, in which the first discovery advertisement message carries a MAC address of a sending end; and recording the MAC address of the sending end; or sending a discovery solicitation message; receiving a second discovery advertisement message, in which the second discovery advertisement message carries a MAC address of a sending end and a WWN identifier of the sending end; and generating mapping between the MAC address of the sending end and the WWN identifier of the sending end.

When the FCoE forwarder 101 sends a discovery solicitation message, the FCoE forwarder 102 and the FCoE target 103 in a network both respond to the discovery solicitation message; but it may also be that when the discovery solicitation message is sent, only the FCoE forwarder 102 responds to the discovery solicitation message.

The MAC addresses of the FCoE target and the FCoE forwarder in the network are collected through step 301.

Step 302: Acquire a local virtual MAC address.

This step may specifically include: according to the MAC address recorded in step 301, generating a MAC address list; according to the MAC address list, selecting a MAC address or select a MAC address of an FCoE forwarder; and sending an FLOGI message, so as to obtain a local MAC address, in which a destination MAC address of the FLOGI message is the selected MAC address. The local MAC address may be the local virtual MAC address of the FCoE initiator 101, and a MAC address may be selected in a random manner or a designated location based manner, which is not specifically limited, Through step 302, the FCoE initiator 101 obtains the allocated MAC address, where this MAC address may be allocated by the FCoE forwarder 102, and may also be allocated by the FCoE target 103.

Step 303: According to a WWN world wide name identifier of a target to be accessed, acquire a destination MAC address used to access the target to be accessed.

Step 304: According to the destination MAC address, perform a login operation for the target to be accessed, so as to establish an FCoE fiber channel over Ethernet communication connection.

According to a WWN world wide name identifier of a target to be accessed, a destination MAC address used to access the target to be accessed is acquired. According to the destination MAC address, a login operation is performed for the target to be accessed, to establish an FCoE fiber channel over Ethernet communication connection, so that the FCoE initiator may directly establish a communication connection with the FCoE target, thereby reducing data transmission delay and lightening the processing load of an original FCoE forwarder.

In the foregoing embodiment, step 303 can further include:

when receiving a first discovery advertisement message from the FCoE forwarder 102 and the FCoE target 101, sending a PLOGI NS port login name server message according to the selected MAC address, so as to query an N_Port_ID N port identifier of the target to be accessed, in which the PLOGI NS message carries the WWN identifier of the target to be accessed; receiving a PLOGI NS answer message, in which the PLOGI NS answer message carries the N_Port_ID of the target to be accessed; and acquiring the N_Port_ID of the target to be accessed; and determining whether the N_Port_ID of the target to be accessed and the recorded MAC address are matched; and if not matched, it indicates that the FC target 104 is accessed, using the MAC address of the FCoE forwarder 102 as the destination MAC address, and if matched, it indicates that the FCoE target 103 is accessed, using the matched MAC address as the destination MAC address;

or when receiving a first discovery advertisement message from the FCoE forwarder 102, sending a PLOGI NS message according to the selected MAC address, so as to query an N_Port_ID of the target to be accessed, in which the PLOGI NS message carries the WWN identifier of the target to be accessed; receiving a FLOG NS answer message, in which the PLOGI NS answer message carries the N_Port_ID of the target to be accessed; acquiring the N_Port_ID of the target to be accessed; generating a detection MAC address by adopting a specific network prefix and the N_Port_ID of the target to be accessed; sending a detection message by taking the detection MAC address as a destination MAC address, which may be, for example, an FLOGI message; if a response message is received within a preset time, for example, the response message is the FLOGI LS_ACC or FLOGI LS_RJT, it indicates that the FCoE target 103 is accessed, using the detection MAC address as the destination MAC address; and if no response message is received within the preset time, it indicates that the FC target 104 is accessed, using the MAC address of the FCoE forwarder 102 as the destination MAC address;

or when receiving a first discovery advertisement message from the FCoE forwarder 102, sending a PLOGI NS message according to the selected MAC address, so as to query an N_Port_ID N of the target to be accessed, in which the PLOGI NS message carries the WWN identifier of the target to be accessed; receiving a FLOG NS answer message, in which the PLOGI NS answer message carries the N_Port_ID of the target to be accessed and a type identifier of the target to be accessed, the type identifier is used to indicate a type of the target to be accessed, and the type includes an FCoE target type and an FC target type; acquiring the N_Port_ID of the target to be accessed; if the type identifier indicates the FCoE target type, it indicates that the FCoE target 103 is accessed, generating the destination MAC address by adopting a specific network prefix and the N_Port_ID; and if the type identifier indicates the FC target type, it indicates that the FC target 104 is accessed, using the MAC address of the FCoE forwarder 102 as the destination MAC address;

or when a second discovery advertisement message is received, querying, according to the generated mapping, a MAC address corresponding to the WWN identifier of the target to be accessed, and if the MAC address is queried, it indicates that the FCoE target 103 is accessed, using the queried MAC address as the destination MAC address; and if no MAC address is queried, it indicates that the FC target 104 is accessed, using the MAC address of the FCoE forwarder 102 as the destination MAC address.

Figure 4:
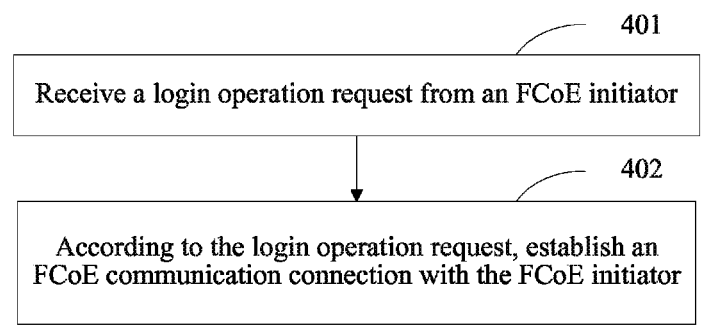
FIG. 4 is a flowchart of a method for establishing an FCoE communication connection according to Embodiment 3 of the present invention.

In this embodiment, when the FCoE initiator 101 accesses the FCoE target 103 and/or the FC target 104, the FCoE initiator 101 needs to first establish an FCoE connection, may establish an FCoE communication connection with the FC target 104 through the FCoE forwarder 102, and may also directly establish an FCoE communication connection with the FCoE target 103 where the function of the FCoE forwarder 102 is similar to that of the FCoE forwarder in the prior art, which is not described herein again. The processing process corresponding to the FCoE target 103 is introduced in detail below:

FIG. 4 shows a method for establishing an FCoE communication connection according to Embodiment 3 of the present invention. It is assumed that before this method, the FCoE target 103 already initiates an FLOGI operation to the FCoE forwarder 102 or a name server Name server, and obtains a virtual MAC address, and the method includes:

Step 401: Receive a login operation request from an FCoE initiator.

In this embodiment, when the FCoE initiator 101 establishes an FCoE communication connection with the FCoE target 103, a login operation request from the FCoE initiator 101 is required to be received, where the login operation request belongs to an FLOGI operation and a PLOGI operation in the prior art, which is not described herein again.

Step 402: According to the login operation request, establish an FCoE communication connection with the FCoE initiator.

The FCoE target 103 receives the login operation request from the FCoE initiator 101, and establishes the FCoE communication connection with the FCoE initiator 101 according to the login operation request, so that the FCoE initiator 101 may directly establish a communication connection with the FCoE target 103, thereby reducing the data transmission delay and lightening the processing load of the original FCoE forwarder.

Figure 5:
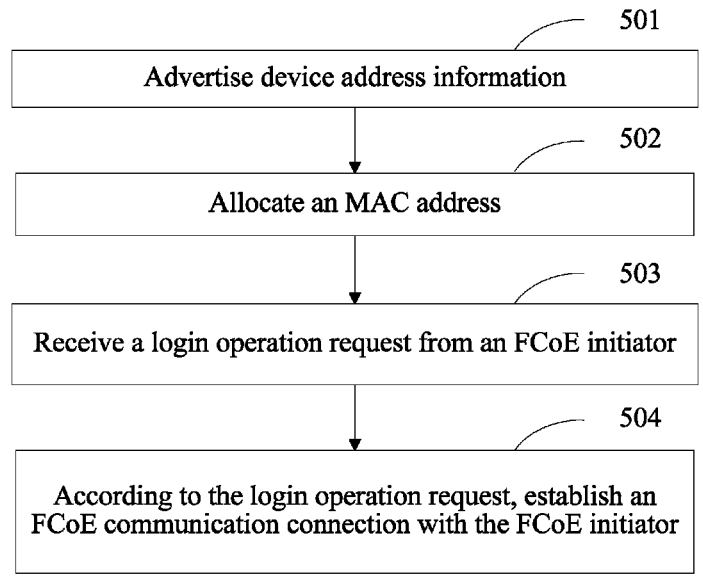
FIG. 5 is a flowchart of a method for establishing an FCoE communication connection according to Embodiment 4 of the present invention.

In the foregoing embodiment, before step 401, the method may further include operations of advertising device address information (for example: the FCoE target 103 advertises the MAC address of the FCoE target 103 to the FCoE initiator 101) and allocating a MAC address (for example: the FCoE target 103 allocates a virtual MAC address to the FCoE initiator 101). FIG. 5 shows a method for establishing an FCoE communication connection according to Embodiment 4 of the present invention, which includes:

Step 501: Advertise device address information, which specifically is:

receiving a discovery solicitation message from the FCoE initiator 101; and sending a first discovery advertisement message to the FCoE initiator 101, so as to respond to the discovery solicitation message, in which the first discovery advertisement message carries a local virtual MAC address, and the virtual MAC address is composed of a specific network prefix and an N_Port_ID;

or receiving a discovery solicitation message from the FCoE initiator 101; and sending a second discovery advertisement message to the FCoE initiator 101, so as to respond to the discovery solicitation message, in which the second discovery advertisement message carries a local MAC address and a local WWN identifier, the carried local MAC address is a virtual MAC address or an actual MAC address, and the virtual MAC address is composed of a specific network prefix and an N_Port_ID.

Step 502: Allocate a MAC address, which specifically is:

receiving an FLOGI message from the FCoE initiator 101; performing a login operation according to the FLOGI message; when the login operation succeeds, allocating a MAC address to the FCoE initiator 101; and sending an FLOGI response message, in which the FLOGI response message carries the allocated MAC address.

Step 503: Receive a login operation request from the FCoE initiator.

Step 504: According to the login operation request, establish an FCoE communication connection with the FCoE initiator.

Step 503 is similar to step 401, and step 504 is similar to step 402, so details are not described again herein.

Figure 6:
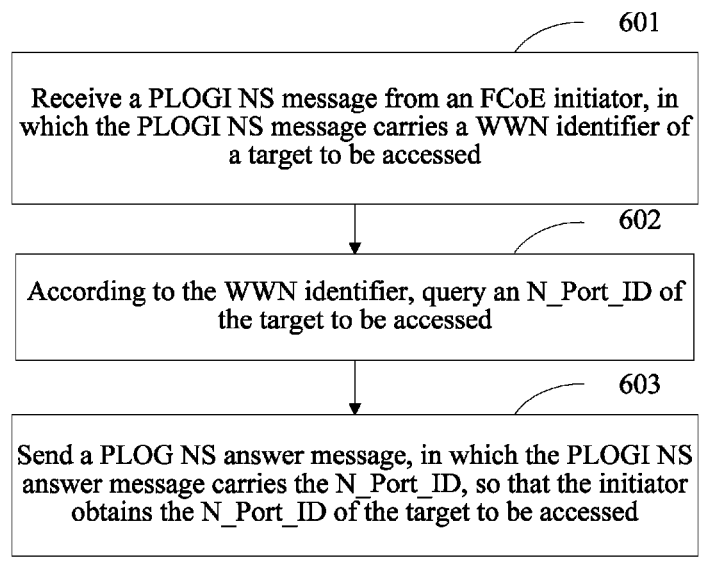
FIG. 6 is a flowchart of a method for establishing an FCoE communication connection according to Embodiment 5 of the present invention.

FIG. 6 shows a method for establishing an FCoE communication connection according to Embodiment 5 of the present invention in this case, the FCoE forwarder 102 may be replaced with a name server (Name server). It is assumed that before this method, the FCoE target 103 already initiates an FLOGI operation to the FCoE forwarder 102 (or a name server), and obtains a virtual MAC address, and in this case, the method process of the FCoE forwarder 102 includes:

Step 601: Receive a PLOGI NS message from an FCoE initiator, in which the PLOGI NS message carries a WWN identifier of a target to be accessed.

Step 602: According to the WWN identifier, query an N_Port_ID of the target to be accessed.

Step 603: Send a PLOG NS answer message, in which e P NS answer message carries the N_Port_ID, so that the initiator obtains the N_Port_ID of the target to be accessed.

The FCoE target 103 receives the PLOGI NS message from the FCoE initiator 101, in which the PLOGI NS message carries the WWN identifier of the target to be accessed; receives the PLOGI NS message from the FCoE initiator, in which the PLOGI NS message carries the WWN identifier of the target to be accessed; and sends the PLOG NS answer message, in which the PLOGI NS answer message carries the N_Port_ID, so that the initiator obtains the N_Port_ID of the target to be accessed, and the FCoE initiator 101 obtains the N_Port_ID of the target to be accessed.

The PLOGI NS answer message may further carry a type identifier of the target to be accessed, and the type identifier is used to indicate a type of the target to be accessed, in which the type includes an FCoE target type and an FC target type. In this way, by carrying the type identifier in the PLOGI NS answer message, the type of the target that the FCoE initiator 101 determines to access may be informed, and a corresponding target is directly accessed, thereby reducing the processing stage of the FCoE initiator 101.

Figure 7:
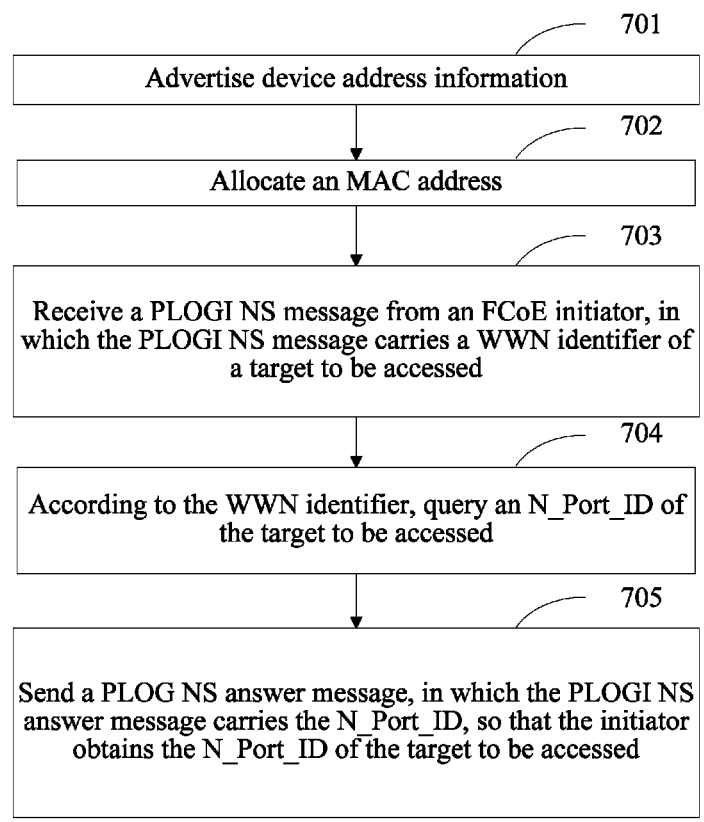
FIG. 7 is a flowchart of a method for establishing an FCoE communication connection according to Embodiment 6 of the present invention.

In the foregoing embodiment, before step 601, the method may further include: operations of advertising device address information (for example: the FCoE target 103 advertises the MAC address of the FCoE target 103 to the FCoE initiator 101) and allocating a MAC address (for example: the FCoE target 103 allocates a MAC address to the FCoE initiator 101). FIG. 7 shows a method for establishing an FCoE communication connection according to Embodiment 6 of the present invention, which includes:

Step 701: Advertise device address information, which specifically is:

receiving a discovery solicitation message from the FCoE initiator 101; and sending a first discovery advertisement message to the FCoE initiator 101, so as to respond to the discovery solicitation message, in which the first discovery advertisement message carries a local MAC address;

or receiving a discovery solicitation message from the FCoE initiator 101; and sending a second discovery advertisement message to the FCoE initiator 101, so as to respond to the discovery solicitation message, in which the second discovery advertisement message carries a local MAC address and a local WWN identifier.

Step 702: Allocate a MAC address, which specifically is:

receiving an FLOGI message from the FCoE initiator 101 or the FCoE target 103;

performing a login operation according to the FLOGI message;

when the login operation succeeds, allocating a MAC address to the FCoE initiator 101 or the FCoE target 103; and sending an FLOGI response message, in which the FLOGI response message carries the allocated MAC address.

In this way, the FCoE initiator 101 obtains an allocated virtual MAC address; the FCoE target 103 obtains an allocated virtual MAC address.

Step 703: Receive a PLOGI NS message from the FCoE initiator, in which the PLOGI NS message carries a WWN identifier of a target to be accessed.

Step 704: According to the WWN identifier, query an N_Port_ID of the target to be accessed.

Step 705: Send a PLOG NS answer message, in which the PLOGI NS answer message carries the N_Port_ID, so that the initiator obtains the N_Port_ID of the target to be accessed.

Step 703 is similar to step 601, and step 704 is similar to step 602, so details are not described again herein.

In the above embodiments, that the FCoE initiator 101, the FCoE forwarder 102, and the FCoE target 103 are all located in a lossless Ethernet is exemplified, and actually, the FCoE initiator 101, the FCoE forwarder 102, and the FCoE target 103 may be located in another network, such as, Ethernet.

The complete process of the embodiment of the present invention is described in detail below.

Figure 8:
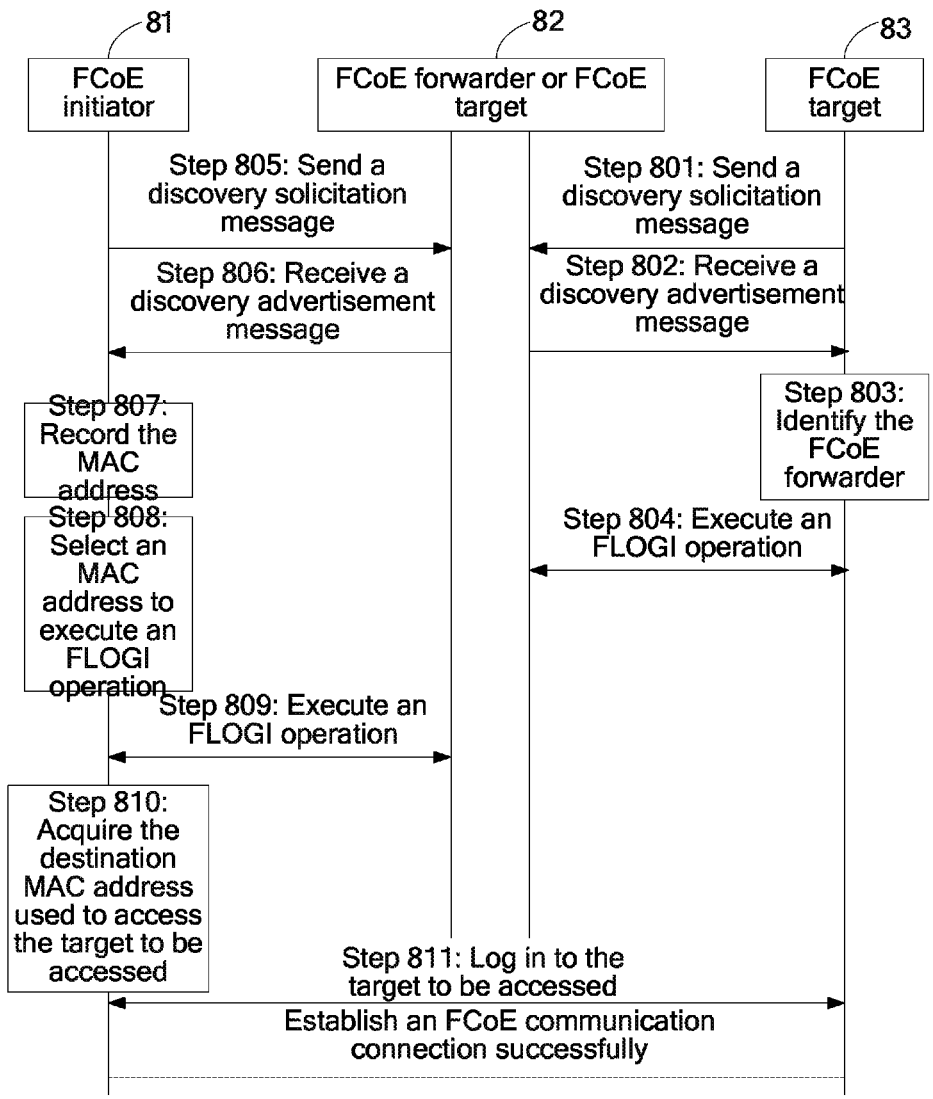
FIG. 8 is a flowchart of a method for establishing an FCoE communication connection according to Embodiment 7 of the present invention.

FIG. 8 is a flowchart of a method for establishing an FCoE communication connection according to Embodiment 7 of the present invention. As shown in FIG. 8, the drawing only shows a process that an FCoE initiator 81 establishes a communication connection with an FCoE target 83, where the process of establishing an FCoE communication connection includes:

Step 801: Send a discovery solicitation message.

When being initiated, the FCoE target 83 sends a Discovery Solicitation message whose destination MAC address is All-FCF-MACs, to obtain a MAC address of a receiving end, where the receiving end may be all FCoE forwarders and FCoE targets in a network, and the All-FCF-MACs is a broadcast address, which may be, for example, 0x'FFFFFF.

Step 802: Receive a discovery advertisement message.

After receiving the Discovery Solicitation message, an FCoE forwarder 82 sends a Discovery Advertisement message back as a response, in which the Discovery Advertisement message carries an EMAC address of the FCoE forwarder 82; if the FCoE forwarder 82 in the drawing is an FCoE target 82, after receiving the Discovery Solicitation message, the FCoE target 82 sends a Discovery Advertisement message back as a response, in which the Discovery Advertisement message carries a VMAC address of the FCoE target 82, the EMAC address is an actual MAC address, the VMAC address is a virtual MAC address, the most significant 24 bits thereof are a specific network prefix (for example, FC-MAP may be adopted), and the least significant 24 bits are an N_Port_ID(N port identifier).

Step 803: Identify the FCoE forwarder.

After receiving multiple Discovery Advertisement messages, the FCoE target 83 identifies, from the MAC address obtained in step 802, an EMAC address whose most significant 24 bits are not a specific network prefix, and the EMAC address corresponds to the FCoE forwarder.

Step 804: Execute an FLOGI operation.

The FCoE target 83 sends an FLOG message to the FCoE forwarder 82 by using the EMAC address obtained in step 803 as the destination MAC address, the FCoE target 83 obtains, through the FLOGI operation, the virtual MAC address allocated by the FCoE forwarder 82, and the virtual MAC address is composed of two parts: the most significant 24 bits being the specific network prefix, and the least significant 24 bits being the N_Port_ID.

Through the above step 801 to step 804, the FCoE target 83 obtains the allocated virtual MAC address, and if the FCoE target 83 already obtains the virtual MAC address before this operation, it is not required to execute step 801 to step 804 to obtain the virtual MAC address.

The following steps are the process that the FCoE initiator 81 establishes the FCoE communication connection:

Step 805: Send a discovery solicitation message.

The FCoE initiator 81 sends a Discovery Solicitation message whose destination MAC address is All-FCF-MACs, to obtain the MAC address of the receiving end.

Step 806: Receive a discovery advertisement message.

After receiving the Discovery Solicitation message, an FCoE forwarder 82 sends a Discovery Advertisement message back as a response, in which the Discovery Advertisement message carries an EMAC address of the FCoE forwarder 82; if the FCoE forwarder 82 in the drawing is an FCoE target 82, after receiving the Discovery Solicitation message, the FCoE target 82 sends a Discovery Advertisement message back as a response, in which the Discovery Advertisement message carries a VMAC address of the FCoE target 82, the EMAC address is an actual MAC address, the VMAC address is a virtual MAC address, and the most significant 24 bits thereof are a specific network prefix. Actually, all FCoE forwarders and all FCoE targets connected to the network each may receive the Discovery Solicitation message, and transmit the Discovery Advertisement message back as a response.

Step 807: Record the MAC address.

The MAC address received in step 806 is recorded.

Step 808: Select a MAC address to execute an FLOGI operation.

In the MAC addresses received in step 806, a MAC is selected as a destination MAC address to perform the FLOG operation, and these MAC addresses include the EMAC address of the FCoE forwarder 82, the VMAC address of the FCoE target 82, and MAC addresses of other FCoE forwarders and FCoE targets. Furthermore, the manner of selecting a MAC address is not limited to the selected manner, and may be, for example, a random selection manner, or selecting a MAC address of an FCoE forwarder.

Step 809: Execute an FLOGI operation,

An FLOG operation is performed on the MAC selected in step 808, where when the selected MAC address is the EMAC address of the FCoE forwarder 82, an FLOGI operation is initiated to the FCoE forwarder 82; when the selected MAC address is the VMAC address of the FCoE target 82, an FLOGI operation is initiated to the FCoE target 82, and actually, all FCoE forwarders and all FCoE targets connected to the network each may be selected as an object for executing the FLOGI operation.

Through this step, the FCoE initiator 81 may obtain the allocated virtual MAC address, and the virtual MAC address is composed of two parts: the most significant 24 bits being the specific network prefix, and the least significant 24 bits being the N_Port_ID.

Furthermore, in the above process that the FCoE initiator 81 establishes the FCoE communication connection, step 805 to step 809 are actually not compulsory. For example, when the FCoE initiator 81 already establishes an FCoE communication connection once previously, and if it needs to establish an FCoE communication connection again, step 805 to step 809 may be omitted.

Step 810: Acquire the destination MAC address used to access the target to be accessed.

The FCoE initiator 81 initiates a PLOGI NS operation to the FCoE target or FCoE forwarder corresponding to the MAC address selected in step 808. The drawing only shows that, when the FCoE target 82 or the FCoE forwarder 82 is selected, a PLOGI NS operation is initiated to the FCoE target 82 or the FCoE forwarder 82, and in this way, the FCoE initiator 81 acquires the N_Port_ID corresponding to the WWN of the target to be accessed. The obtained N_Port_ID of the target to be accessed and the last 24 bits of each of all MAC addresses recorded in step 807 are matched; if not matched, it indicates that the FC target 104 is accessed, the MAC address of the FCoE forwarder 102 is used as the destination MAC address, and if matched, it indicates that the FCoE target 103 is accessed, the matched MAC address is used as the destination MAC address.

Step 811: Log in to the target to be accessed.

When the type of the target to be accessed is determined as the FC target in step 810, a registration/login procedure completely complies with an FC-BB-5 protocol, which is not described again herein. When the type of the target to be accessed is determined as the FCoE target in step 810, registration/login is initiated to the FCoE target according to the destination MAC address obtained in step 810. For example, as shown in the drawing, the FCoE initiator 81 initiates an FLOGI operation and a PLOGI operation to the FCoE target 83, so as to log in to the FCoE target 83, where in this step, the FLOGI operation may be: selecting whether to re-allocate a virtual MAC address to the FCoE initiator 81; if selecting not to re-allocate a virtual MAC address, continuing to use the virtual MAC address obtained in step 809, and if selecting to re-allocate a virtual MAC address, obtaining a virtual MAC address again.

The FCoE communication connection is established successfully.

Figure 9:
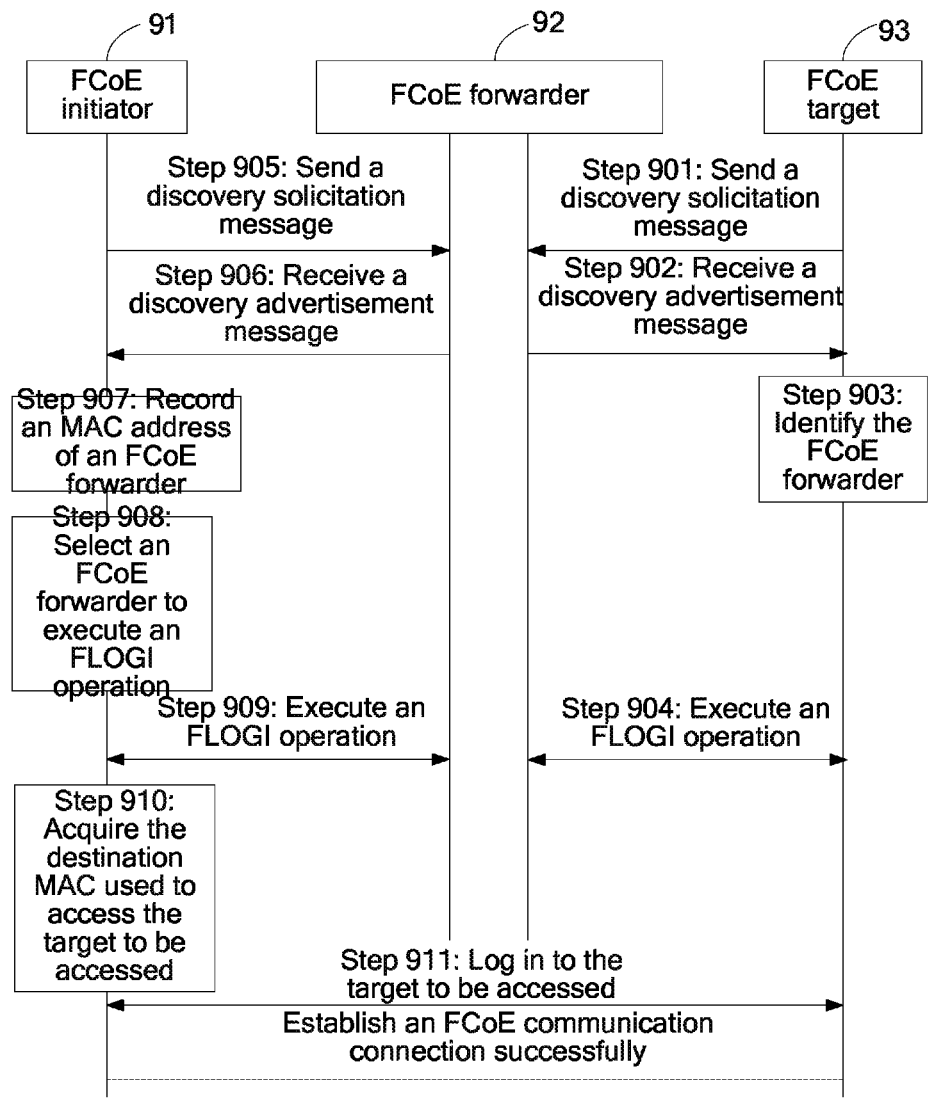
FIG. 9 is a flowchart of a method for establishing an FCoE communication connection according to Embodiment 8 of the present invention.

FIG. 9 is a flowchart of a method for establishing an FCoE communication connection according to Embodiment 8 of the present invention. As shown in FIG. 9, the method includes:

Step 901: Send a discovery solicitation message.

Step 902: Receive a discovery advertisement message.

Step 903: Select an FCoE forwarder.

Step 904: Execute an FLOGI operation.

The above step 901 to step 904 are similar to the above step 801 to step 804, and the difference lies in that, the interaction operation in step 901 to step 910 only relates to the interaction operation of the FCoE target 93 and the FCoE forwarder 92 or another FCoE forwarder in the network, and does not relate to the interaction operation of another FCoE target. For example, after the Discovery Solicitation message is sent in step 901, only the FCoE forwarder 92 and another FCoE forwarder in the network send the Discovery Advertisement message back as a response; in step 903, it only needs to select an FCoE forwarder from the EMAC address obtained in the Discovery Advertisement message, and the FCoE forwarder initiates an FLOGI operation, so as to obtain the MAC virtual address. Furthermore, if the FCoE target 93 already obtains the virtual MAC address before this operation, it is not required to execute step 901 to step 904 to obtain the virtual MAC address.

In order to make the FCoE target not relate to the interaction operation, various methods may be adopted in above step 901 to step 904, for example: the FCoE target is set to not respond to the discovery solicitation message, or, the destination MAC address of the discovery solicitation message is modified, so that the FCoE target does not receive the discovery solicitation message.

The following steps are the process that the FCoE initiator 91 establishes the FCoE communication connection: p Step 905: Send a discovery solicitation message.

Step 906: Receive a discovery advertisement message.

Step 907: Record a MAC address of an FCoE forwarder.

Step 908: Select an FCoE forwarder to execute an FLOGI operation,

Step 909: Execute the FLOGI operation.

The above step 905 to step 909 are similar to the above step 805 to step 810, and the difference lies in that, the interaction operation in step 905 to step 910 only relates to the interaction operation of the FCoE initiator 91 and the FCoE forwarder 92 or another FCoE forwarder in the network, and does not relate to the interaction operation of the FCoE target 93 or another FCoE target. For example, after the Discovery Solicitation message is sent in step 905, only the FCoE forwarder 92 and another FCoE forwarder in the network send the Discovery Advertisement message back as a response; in step 906, it only needs to select a MAC address corresponding to an FCoE forwarder from the EMAC address obtained in the Discovery Advertisement message, and an FLOGI operation is initiated to the FCoE forwarder by taking the MAC address as the destination MAC address.

Furthermore, in the above process that the FCoE initiator 91 establishes the FCoE communication connection, step 905 to step 909 are actually not compulsory. For example, when the FCoE initiator 91 already establishes an FCoE communication connection once previously, and if it needs to establish an FCoE communication connection again, step 905 to step 909 may be omitted, Step 910: Acquire the destination MAC used to access the target to be accessed.

The step may include the following steps.

The FCoE initiator 91 initiates a PLOGI NS operation to the FCoE forwarder corresponding to the MAC address selected in step 908, and in this way, the FCoE initiator 91 acquires the N_Port_ID corresponding to the WWN of the target to be accessed; a detection MAC address is generated through N_Port_ID and a specific network prefix, the FCoE initiator 91 initiates, through the generated detection MAC address, a detection operation to the target to be accessed, and if no detection response message is received within a preset time, it indicates that the type of the target to be accessed is the FC target, the MAC address of the FCoE forwarder is used as the destination MAC address; if a detection response message is received within the preset time, it indicates that the type of the target to be accessed is the FCoE target, the detection MAC address is used as the destination MAC address. For example, the FLOGI operation may be performed by taking the detection MAC address as the destination MAC address, and if no FLOGI LS ACC message or LS_RJT message is received within a preset time, it indicates that the type of the target to be accessed is the FC target; if an FLOGI LS_ACC message is received within the preset time, it indicates that the type of the target to be accessed is the FCoE target; or The FCoE initiator 91 initiates a PLOGI NS operation to the FCoE forwarder corresponding to the MAC address selected in step 908, and meanwhile, the PLOGI NS response message sent to the FCoE initiator 91 carries both the N_Port_ID corresponding to the WWN of the target to be accessed and the type identifier of the target to be accessed, in which the type identifier is used to indicate whether the N_Port_ID is the N_Port_ID of the FC target or is the N_Port_ID of the FCoE target; if the type identifier indicates the FC target type, it indicates that the type of the target to be accessed is the FC target, the MAC address of the FCoE forwarder is used as the destination MAC address; if the type identifier indicates the FCoE target type, it indicates that the type of the target to be accessed is the FCoE target, the destination MAC address is generated by using a specific network prefix and the Step 911: Log in to the target to be accessed.

When the type of the target to be accessed is determined as the FC target in step 910, the registration/login procedure completely complies with the FC-BB-5 protocol, which is not described again herein. When the type of the target to be accessed is determined as the FCoE target in step 910, registration/login is initiated to the FCoE target according to the destination MAC address obtained in step 910. For example, as shown in the drawing, the FCoE initiator 91 initiates an FLOGI operation and a PLOGI operation to the FCoE target 93, so as to log in to the FCoE target 93, where in this step, the FLOGI operation may be: selecting whether to re-allocate a virtual MAC address to the FCoE initiator 91; if selecting not to re-allocate a virtual MAC address, continuing to use the virtual MAC address obtained in step 909, and if selecting to re-allocate a virtual MAC address, obtaining a virtual MAC address again.

The FCoE communication connection is established successfully.

Figure 10:
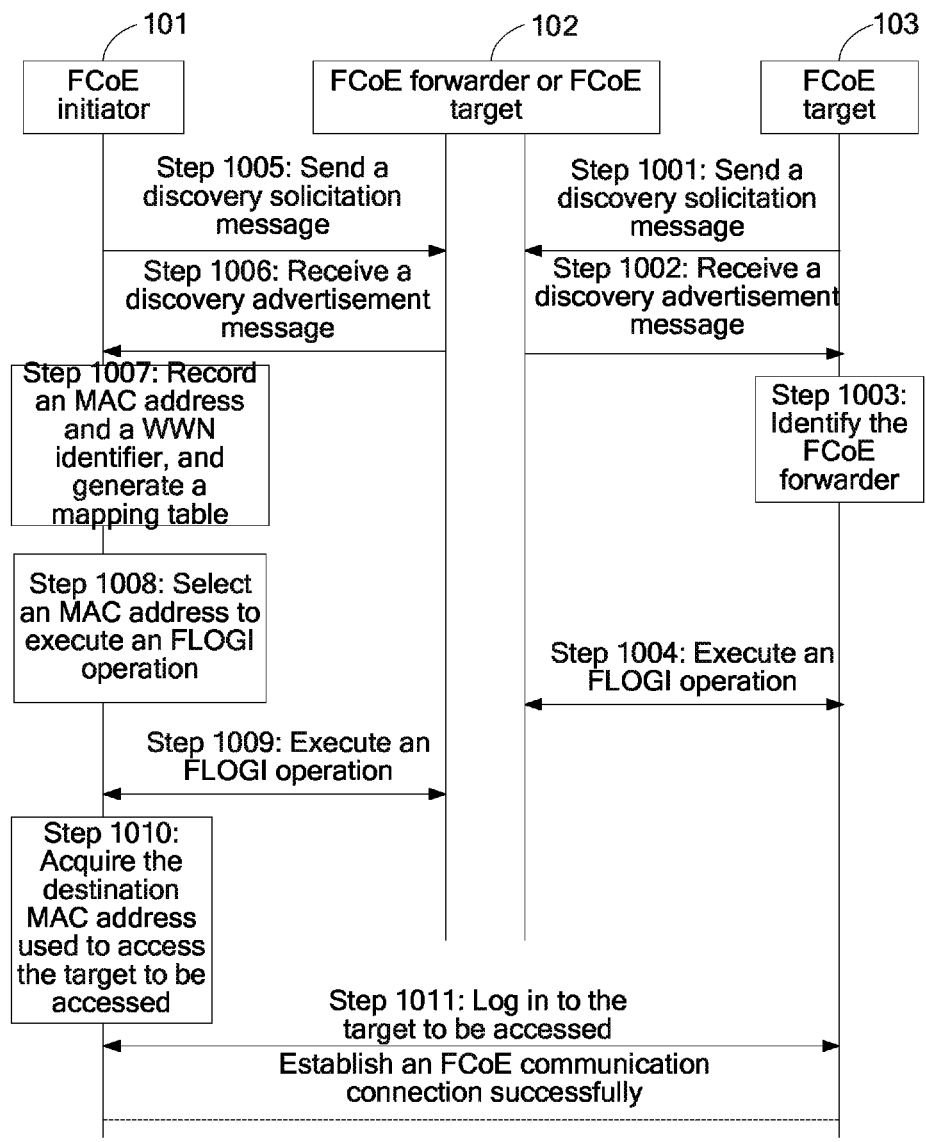
FIG. 10 is a flowchart of a method for establishing an FCoE communication connection according to Embodiment 9 of the present invention.

FIG. 10 is a flowchart of a method fur establishing an FCoE communication connection according to Embodiment 9 of the present invention. As shown in FIG. 10, the method includes:

Step 1001: Send a discovery solicitation message.
Step 1002: Receive a discovery advertisement message.
Step 1003: Identify an FCoE forwarder.
Step 1004: Execute an FLOGI operation.

The above step 1001 to step 1004 are similar to the above step 801 to step 804, and the difference lies in that, in step 1002, in addition to carrying the MAC address, the Discovery Advertisement messages returned by the FCoE target and the FCoE forwarder may further carry the WWN identifiers corresponding to the FCoE target and the FCoE forwarder.

Furthermore, if the FCoE target 103 already obtains the virtual MAC address before this operation, it is not required to execute step 1001 to step 1004 to obtain the virtual MAC address.

The following steps are the process that the FCoE initiator 101 establishes the FCoE communication connection:

Step 1005: Send a discovery solicitation message.
Step 1006: Receive a discovery advertisement message.
Step 1007: Record a MAC address and a WWN identifier, and generate a mapping table.
Step 1008: Select a MAC address to execute an FLOGI operation.
Step 1009: Execute an FLOGI operation.

The above step 1005 to step 1009 are similar to the above step 805 to step 809, and the difference lies in that, in step 1006, in addition to carrying the MAC address, the Discovery Advertisement messages returned by the FCoE target and the FCoE forwarder further needs to carry the WWN identifiers corresponding to the FCoE target and the FCoE forwarder, where the carried MAC address is a virtual MAC address or an actual MAC address, and the virtual MAC address is composed of a specific network prefix and an N_Port_ID; in step 1007, not only the MAC address but also the WWN identifier need to be recorded, and a mapping table between the MAC address and the WWN identifier is established. For example: the FCoE target 102 returns a Discovery Advertisement message, the message carries a MAC address (VMAC1) and a WWN (WWN1) identifier of the FCoE target 102, then the FCoE initiator 101 needs to establish such a mapping entry: VMAC1—WWN1, and after multiple entries are established, a mapping table between the MAC address and the WWN identifier is obtained.

In the above process that the FCoE initiator 101 establishes the FCoE communication connection, step 1005 to step 1009 are actually not compulsory. For example, when the FCoE initiator 101 already establishes an FCoE communication connection once previously, and if it needs to establish an FCoE communication connection again, step 1005 to step 1009 may be omitted.

The FCoE initiator 101 obtains the MAC address in the above step.

Step 1010: Acquire the destination MAC used to access the target to be accessed.

The FCoE initiator 101 queries, in the mapping table generated in step 1007, whether an entry corresponding to the WWN identifier exists according to the WWN identifier of the target to be accessed, and if the entry exists, it indicates that the type of the target to be accessed is the FCoE target, the MAC address corresponding to the entry is used as the destination MAC address; otherwise, it indicates that the type of the target to be accessed is the FC target, the MAC address of the FCoE forwarder is used as the destination MAC address.

Step 1011: Log in to the target to be accessed.

When the type of the target to be accessed is determined as the FC target in step 1010, the registration/login procedure completely complies with the FC-BB-5 protocol, which is not described again herein. When the type of the target to be accessed is determined as the FCoE target in step 1010, registration/login is initiated to the FCoE target according to the destination MAC address obtained in step 1010. For example, as shown in the drawing, the FCoE initiator 101 initiates an FLOGI operation and a PLOGI operation to the FCoE target 103, so as to log in to the FCoE target 103, where in this step, the FLOGI operation may be: selecting whether to re-allocate a virtual MAC address to the FCoE initiator 101; if selecting not to re-allocate a virtual MAC address, continuing to use the virtual MAC address obtained in step 1009, and if selecting to reallocate a virtual MAC address, obtaining a virtual MAC address again.

The FCoE communication connection is established successfully.

Figure 11:
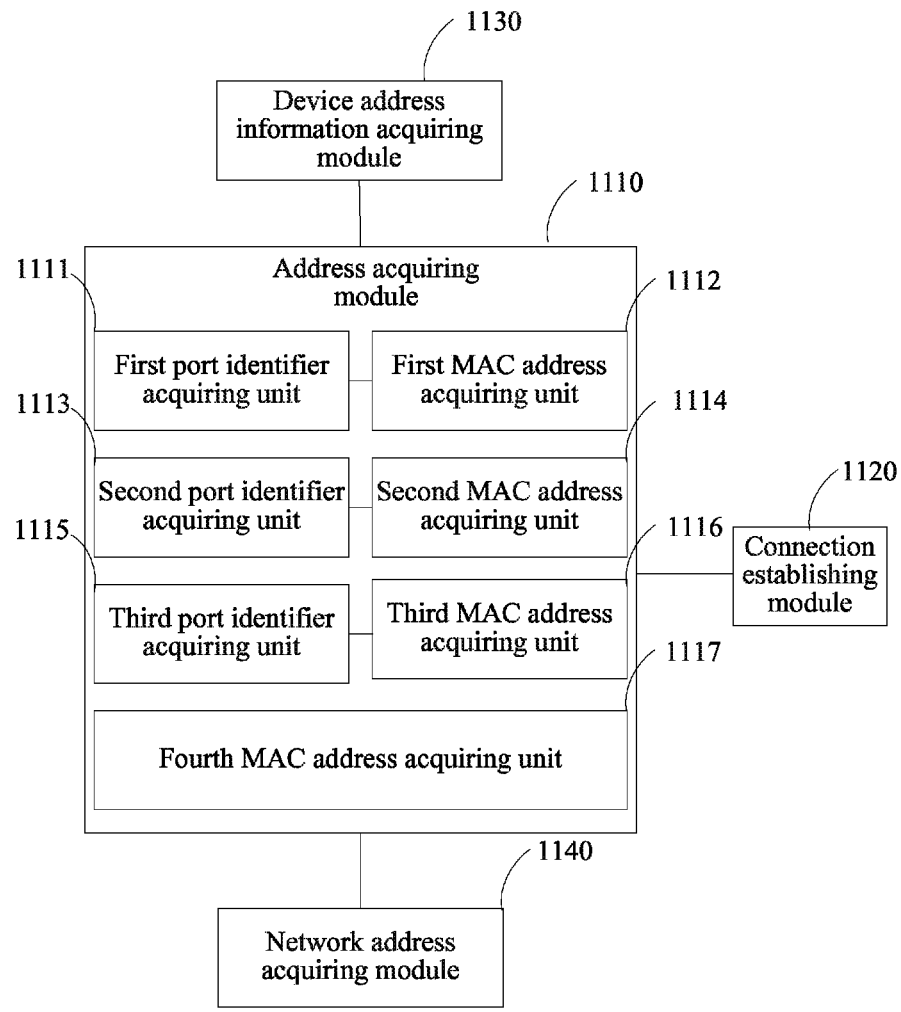
FIG. 11 is a schematic diagram of an apparatus for establishing an FCoE communication connection according to an embodiment of the present invention.

An embodiment of the present invention further provides an apparatus for establishing an FCoE communication connection. As shown in FIG. 11, the apparatus includes:

an address acquiring module 1110, configured to, according to a WWN world wide name identifier of a target to be accessed, acquire a destination MAC address used to access the target to be accessed; and a connection establishing module 1120, configured to, according to the destination MAC address acquired by the address acquiring module 1110, perform a login operation for the target to be accessed, so as to establish an FCoE fiber channel over Ethernet communication connection.

The apparatus may further include:

a device address information acquiring module 1130, configured to send a discovery solicitation message; receive a first discovery advertisement message, in which the first discovery advertisement message carries a MAC address of a sending end; and record the MAC address of the sending end; or configured to send a discovery solicitation message; receive a second discovery advertisement message, in which the second discovery advertisement message carries a MAC address of a sending end and a WWN identifier of the sending end; and generate mapping between the MAC address of the sending end and the WWN identifier of the sending end.

The apparatus may further include:

a network address acquiring module 1140, configured to, according to the recorded MAC address of the sending end, generate a MAC address list; according to the MAC address list, select a MAC address or select a MAC address of an FCoE forwarder; and send an FLOGI message, so as to obtain a local MAC address, in which a destination MAC address of the FLOGI message is the selected MAC address.

The address acquiring module 1110 includes:

a first port identifier acquiring unit 1111, configured to, when receiving first discovery advertisement messages from an FCoE forwarder and an FCoE target, send a PLOGI NS port login name server message according to the MAC address selected by the network address acquiring module 1140, so as to query an N_Port_ID N port identifier of the target to be accessed, in which the PLOGI NS message carries the WWN identifier of the target to be accessed; receive a PLOGI NS answer message, in which the PLOGI NS answer message carries the N_Port_ID of the target to be accessed; and acquire the N_Port_ID of the target to be accessed; and a first MAC address acquiring unit 1112, configured to determine whether the N_Port_ID of the target to be accessed acquired by the first port identifier acquiring unit 1111 and the MAC address recorded by the device address information acquiring module 1130 are matched; if not matched, use the MAC address of the FCoE forwarder as the destination MAC address; and if matched, use the matched MAC address as the destination MAC address;

or a second port identifier acquiring unit 1113, configured to, when receiving a first discovery advertisement message from an FCoE forwarder, send a PLOGI NS message according to the MAC address selected by the network address acquiring module 1140, so as to query an N_Port_ID N of the target to be accessed, in which the PLOGI NS message carries the WWN identifier of the target to be accessed; receive a PLOG NS answer message, in which the PLOGI NS answer message carries the N_Port_ID of the target to be accessed; and acquire the N_Port_ID of the target to be accessed; and a second MAC address acquiring unit 1114, configured to generate a detection MAC address by adopting a specific network prefix and the N_Port_ID of the target to be accessed acquired by the second port identifier acquiring unit 1113; send a detection message by taking the detection MAC address as a destination MAC address; if a response message is received within a preset time, use the detection MAC address as the destination MAC address; and if no response message is received within the preset time, use the MAC address of the FCoE forwarder as the destination MAC address;

or a third port identifier acquiring unit 1115, configured to, when receiving a first discovery advertisement message from an FCoE forwarder, send a PLOGI NS message according to the MAC address selected by the network address acquiring module 1140, so as to query an N_Port_ID N of the target to be accessed, in which the PLOGI NS message carries the WWN identifier of the target to be accessed; receive a PLOG NS answer message, in which the PLOGI NS answer message carries the N_Port_ID of the target to be accessed and a type identifier of the target to be accessed, the type identifier is used to indicate a type of the target to be accessed, and the type includes an FCoE target type and an FC target type; and acquire the N_Port_ID of the target to be accessed; and a third MAC address acquiring unit 1116, configured to, when the type identifier acquired by the third port identifier acquiring unit 1115 indicates the FCoE target type, generate the destination MAC address by adopting a specific network prefix and the N_Port_ID of the target to be accessed acquired by the third port identifier acquiring unit 1115; and if the type identifier indicates the FC target type, use the MAC address of the FCoE forwarder as the destination MAC address;

or a fourth MAC address acquiring unit 1117, configured to, when receiving a second discovery advertisement message, query a MAC address corresponding to the WWN identifier of the target to be accessed according to the mapping generated by the device address information acquiring module 1130, and if the MAC address is queried, use the queried MAC address as the destination MAC address; and if no MAC address is queried, use the MAC address of the FCoE forwarder as the destination MAC address.

Figure 12:
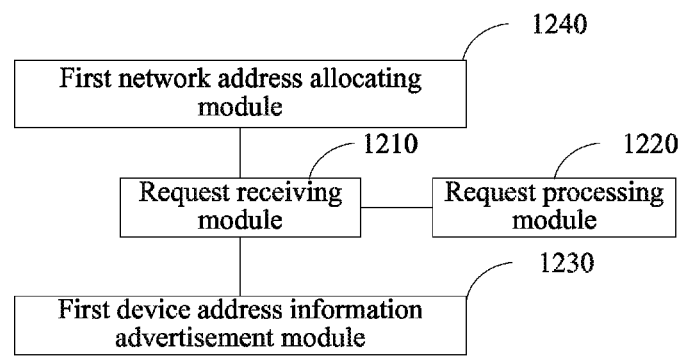
FIG. 12 is a schematic diagram of another apparatus for establishing an FCoE communication connection according to an embodiment of the present invention.

An embodiment of the present invention further provides another apparatus for establishing an FCoE communication connection. As shown in FIG. 12, the apparatus includes:

a request receiving module 1210, configured to receive a login operation request from an FCoE initiator; and a request processing module 1220, configured to, according to the login operation request received by the request receiving module 1210, establish an FCoE communication connection with the FCoE initiator.

The apparatus can further include:

a first device address information advertisement module 1230, configured to receive a discovery solicitation message from the FCoE initiator; and send a first discovery advertisement message to the FCoE initiator, so as to respond to the discovery solicitation message, in which the first discovery advertisement message carries a local virtual MAC address, and the virtual MAC address is composed of a specific network prefix and an N_Port_ID; or send a second discovery advertisement message to the FCoE initiator, so as to respond to the discovery solicitation message, in which the second discovery advertisement message carries a local MAC address and a local WWN identifier, the carried local MAC address is a virtual MAC address or an actual MAC address, and the virtual MAC address is composed of a specific network prefix and an N_Port_ID.

The apparatus may further include:

a first network address allocating module 1240, configured to receive an FLOGI message from the FCoE initiator; perform a login operation according to the FLOGI message; when the login operation succeeds, allocate a MAC address to the FCoE initiator; and send an FLOGI response message, in which the FLOGI response message carries the allocated MAC address.

Figure 13:
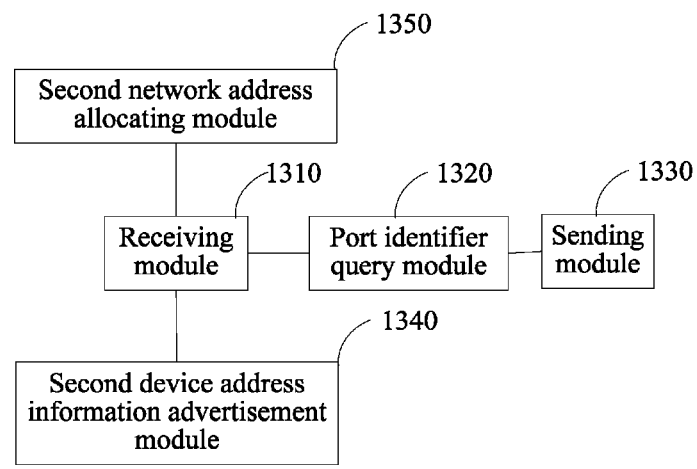
FIG. 13 is a schematic diagram of a name server according to an embodiment of the present invention.

An embodiment of the present invention further provides a name server. As shown in FIG. 13, the name server includes:

a receiving module 1310, configured to receive a PLOGI NS message from an FCoE initiator, in which the PLOGI NS message carries a WWN identifier of a target to be accessed;

a port identifier query module 1320, configured to, according to the WWN identifier received by the receiving module 1310, query an N_Port_ID of the target to be accessed; and a sending module 1330, configured to send a first PLOG NS answer message, in which the first PLOGI NS answer message carries the N_Port_ID queried by the port identifier query module 1320, so that the FCoE initiator obtains the N_Port_ID of the target to be accessed.

The sending module 1330 may further be configured to send a second PLOG NS answer message, in which the second PLOGI NS answer message carries the N_Port_ID and a type identifier of the target to be accessed, the type identifier is used to indicate a type of the target to be accessed, and the type includes an FCoE target type and an FC target type.

The name server can further include:

a second device address information advertisement module 1340, configured to receive a discovery solicitation message from the FCoE initiator; and send a first discovery advertisement message to the FCoE initiator, so as to respond to the discovery solicitation message, in which the first discovery advertisement message carries a local MAC address; or configured to send a second discovery advertisement message to the FCoE initiator, so as to respond to the discovery solicitation message, in which the second discovery advertisement message carries a local MAC address and a local WWN identifier.

The name server can further include:

a second network address allocating module 1350, configured to receive an FLOGI message from the FCoE initiator or the FCoE target; perform a login operation according to the FLOGI message; when the login operation succeeds, allocate a MAC address to the FCoE initiator or the FCoE target; and send an FLOGI response message, in which the FLOGI response message carries the allocated MAC address.

An embodiment of the present invention further provides a system for establishing an FCoE communication connection, and the system includes:

at least one apparatus for establishing an FCoE communication connection provided in the above embodiment; and at least one apparatus for establishing an FCoE communication connection provided in the above embodiment or at least one name server provided in the above embodiment.

In Embodiment 1 of the present invention, step 201 can further include:

The FCoE initiator 101 sends a name server query message to a name server, so as to query the N_Port_ID N port identifier of the target to be accessed, in which the name server query message carries the WWN identifier of the target to be accessed; and receives a name server query answer message, in which the name server query answer message is an answer message of the name server query message.

When the name server query answer message does not carry the N_Port_ID, it indicates that the FC target 104 is accessed, the MAC address of the FCoE forwarder 102 is used as the destination MAC address of the target to be accessed, the access to the FC target 104 is implemented through the FCoE forwarder 102; when the name server query answer message carries the N_Port_ID and the destination MAC address of the target to be accessed, the access to the FCoE target 103 is implemented through the destination MAC address, in which the destination MAC address of the target to be accessed includes: the destination MAC address generated by adopting a specific network prefix (for example, FC-MAP (Fiber Channel Mapped Address Prefix)) and the N_Port_ID, or an actual MAC address. In practical use, a PLOGI NS port login name server message may be used to replace the name server query message, and a self-defined message may also be used to replace the name server query message; here, correspondence between an N_Port_ID of an FCoE target and a WWN is saved in a name server, while correspondence between an N_Port_ID of an FC target and a WWN is not saved in the name server, so if the query answer message returned by the name server carries no N_Port_ID information, it indicates that a corresponding FCoE target is not queried, it may be determined that the target to be accessed should be the EC target; or The FCoE initiator 101 sends a discovery solicitation message whose destination MAC address is All-FCF-MACs or ALL_VN2VN_MACs, and the message carries the WWN of the target to be accessed; for the destination address being All-FCF-MACs, a receiving end may be all FCoE nodes (an FCoE initiator and an FCoE target) and FCoE forwarders in a network, and for the destination address being ALL_VN2VN_MACs, the receiving end may be all FCoE nodes in the network, where All-FCF-MACs is a broadcast address, for example, may be 0x'FFETTT, and ALL_VN2VN_MACs is a multicast address fir an FCoE node. If the FCoE initiator does not receive the discovery solicitation answer message corresponding to the discovery solicitation message, it indicates that the FC target 104 is accessed, the MAC address of the FCoE forwarder 102 is used as the destination MAC address, and the access to the FC target 104 is implemented through the FCoE forwarder 102. If the FCoE initiator receives the discovery solicitation answer message, in which the discovery solicitation answer message carries the N_Port_ID of the target to be accessed and the destination MAC address of the target to be accessed, the access to the FCoE target 103 is implemented by acquiring the destination MAC address. In practical use, a PLOGI NS port login name server message may be used to replace the name server query message, and a self-defined message may also be used to replace the name server query message. Here, the FCoE target that receives the discovery solicitation message may query whether the WWN of the FCoE target and the WWN of the target to be accessed are the same, and if the same, may transmit back a. discovery solicitation answer message, to inform the N_Port_ID of the FCoE initiator.

Figure 14:
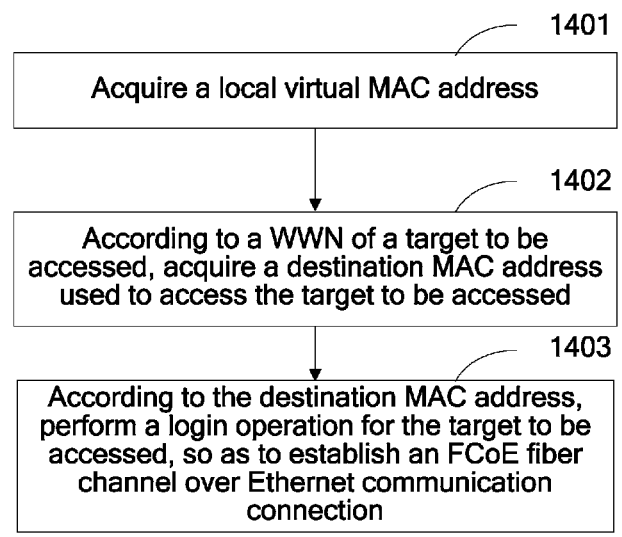
FIG. 14 is a flowchart of a method for establishing an FCoE communication connection according to Embodiment 10 of the present invention.

Correspondingly, when the FCoE initiator 101 does not obtain its own N_Port_ID, the operation of acquiring the MAC address of an FCoE node may further be included before step 201. FIG. 14 shows a method for establishing an FCoE communication connection according to Embodiment 10 of the present invention, which includes:

Step 1401: Acquire a local virtual MAC address.

This step may specifically include: an FCoE initiator 101 executes an FLOGI operation, and obtains an N_Port_ID allocated by a name server, in which a virtual MAC address is composed of a specific network prefix and the N_Port_ID.

Through step 1401, the virtual MAC address allocated by the name server to an FCoE node ensures that the FCoE node can quickly acquire the virtual MAC address, thereby improving the efficiency of allocating an address.

Step 1402: According to a WWN world wide name identifier of a target to be accessed, acquire a destination MAC address used to access the target to be accessed.

Step 1403: According to the destination MAC address, perform a login operation for the target to be accessed, so as to establish an FCoE fiber channel over Ethernet communication connection.

According to a WWN world wide name identifier of a target to be accessed, acquire a destination MAC address used to access the target to be accessed. According to the destination MAC address, perform a login operation for the target to be accessed, so as to establish an FCoE fiber channel over Ethernet communication connection, so that the FCoE initiator may directly establish a communication connection with the FCoE target, thereby reducing data transmission delay and lightening the processing load of an original FCoE forwarder.

In the foregoing embodiment, step 1403 may specifically include:

When the type of the target to be accessed is determined as an FC target in step 1402, a registration/login procedure completely complies with an FC-BB-5 protocol, which is not described again herein. When the type of the target to be accessed is determined as an FCoE target in step 1402, registration/login is initiated to the FCoE target according to the destination MAC address obtained in step 1402. For example, as shown in the drawing, an FCoE initiator 101 initiates an FLOGI operation and a PLOGI operation to an FCoE target 103, so as to log in to the FCoE target 103, where in this step, the FLOGI operation may be: selecting whether to re-allocate a virtual MAC address to the FCoE initiator 101; if selecting not to re-allocate a virtual MAC address, continuing to use the virtual MAC address obtained in step 1401, and if selecting to re-allocate a virtual MAC address, obtaining a virtual MAC address again.

The FCoE communication connection is established successfully.

In the foregoing embodiment, before step 1401, it needs to acquire the MAC address of a name server and the MAC address of an FCoE forwarder, which may include:

configuring, by an FCoE node, the MAC address of the name server and the MAC address of the FCoE forwarder beforehand;

or adopting different discovery solicitations for the name server and the FCoE forwarder, and by receiving an answer message, acquiring the MAC address of the name server and the MAC address of the FCoE forwarder, for example, for the FCoE forwarder, sending a multicast discovery solicitation whose multicast destination MAC address is All-FCF-MACs, and receiving an answer message sent by the FCoE forwarder from a network, in which the answer message carries the MAC address of the FCoE forwarder; for the name server, sending a multicast discovery solicitation whose multicast destination MAC address is ALL-NS-MACs, and receiving an answer message sent by the name server from the network, in which the answer message carries the MAC address of the name server.

Figure 15:
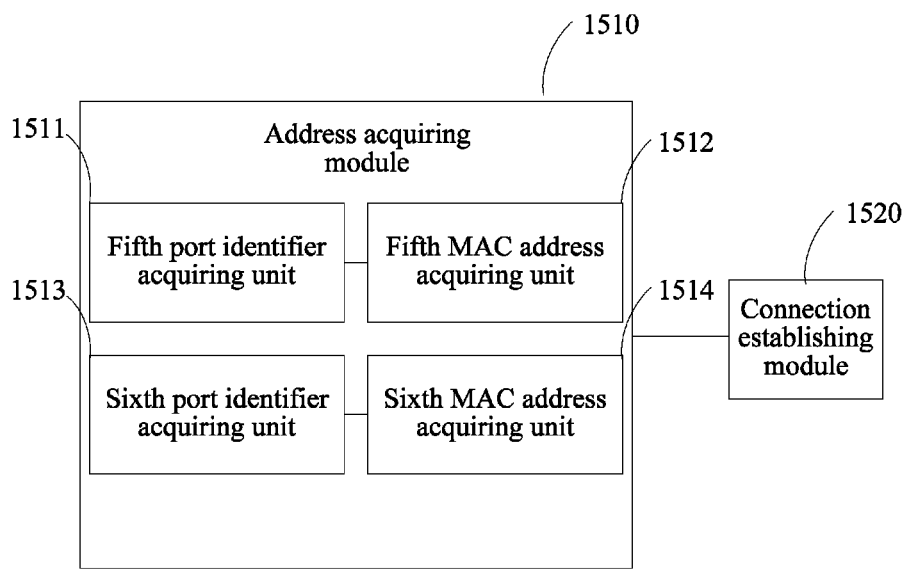
FIG. 15 is a schematic diagram of an apparatus for establishing an FCoE communication connection according to an embodiment of the present invention.

FIG. 15 is an apparatus for establishing an FCoE communication connection according to an embodiment of the present invention. The apparatus includes: an address acquiring module 1510 and a connection establishing module 1520, where the address acquiring module 1510 may include:

a fifth port identifier acquiring unit 1511, configured to send a name server query message, in which the name server query message carries a WWN identifier of a target to be accessed; and receive a name server query answer message, in which the name server query answer message carries an N_Port_ID of the target to be accessed; and a fifth MAC address acquiring unit 1512, configured to acquire the N_Port_ID of the target to be accessed carried in the name server query answer message received by the fourth port identifier acquiring unit, and generate a destination MAC address through a specific network prefix and the N_Port_ID ;

or a sixth port identifier acquiring unit 1513, configured to send a discovery solicitation message, in which the discovery solicitation message carries a WWN of the target to be accessed; and receive a discovery solicitation answer message, in which the discovery solicitation answer message carries an N_Port_ID of the target to be accessed; and a sixth MAC address acquiring unit 1514, configured to acquire the N_Port_ID of the target to be accessed carried in the discovery solicitation answer message received by the fifth port identifier acquiring unit, and generate a destination MAC address through a specific network prefix and the N_Port_ID .

The connection establishing module 1520 is configured to, according to the destination MAC address acquired by the address acquiring module 1510, perform a login operation for the target to be accessed, so as to establish an FCoE fiber channel over Ethernet communication connection.

Through the description of the preceding embodiments, a person skilled in the art may clearly understand that the present invention may be implemented by software plus a necessary hardware platform, and definitely may also be implemented by hardware, but in most cases, the former is a preferred implementation manner. Based on such understanding, the technical solutions of the present invention may be entirely or the part that contributes to the prior art may be embodied in the form of a software product. The computer software product is stored in a storage medium, such as ROM/RAM, magnetic disk, and compact disk, and includes several instructions instructing a computer device (which may be a personal computer, a server, a network device, or the like) to execute the method provided in each embodiment of the present invention or described in a certain part of each embodiment.

Finally, it should be noted that the foregoing embodiments are merely intended for describing the technical solutions of the present invention other than limiting the present invention. Although the present invention is described in detail with reference to exemplary embodiments, a person of ordinary skill in the art should understand that they can still make modifications or equivalent substitutions to the technical solutions of the present invention, and such modifications or equivalent substitutions cannot make the modified technical solutions depart from the idea and scope of the technical solutions of the present invention.

What is claimed is:

1. A method, executed in a lossless Ethernet by a Fiber Channel over Ethernet (FCoE) initiator configured to initiate a data access operation of a first target device, for establishing an FCoE connection between the first target device and the FCoE initiator, the method comprising:
   sending, to one or more FCoE forwarders and one or more target devices in the lossless Ethernet, discovery solicitation messages for acquiring Media Access Control (MAC) addresses of the FCoE forwarders and the target devices;
   receiving, from one or more of the FCoE forwarders and one or more of the target devices, discovery advertisement messages in response to the discovery solicitation messages, wherein one of the discovery advertisement messages sent from the first target device includes a first MAC address of the first target device;
   sending, to a name server, a message including a World Wide Name (WWN) identifier of the first target device for acquiring identifier information of the first target device;
   receiving, from the name server, an answer message carrying the identifier information of the first target device;
   determining that the identifier information matches with at least a portion of the first MAC address of the first target device; and
   performing, a login operation to establish the FCoE connection with the first target device according to the first MAC address.

2. The method of claim 1, wherein the identifier information is information about an N_Port_ID of the first target device.

3. The method of claim 1, the method further comprising:
   sending a message for obtaining a local MAC address to one of the FCoE forwarder; and
   receiving the local MAC address assigned by the FCoE forwarder.

4. The method of claim 1, the method further comprising:
   sending a message for obtaining a local MAC address to one of the target devices; and
   receiving the local MAC address assigned by one of the FCoE forwarders.

5. A computer program product comprising a non-transitory computer readable medium having stored thereon computer executable instructions for establishing an FCoE connection between a first target device and an FCoE initiator configured to initiate a data access operation of the first FCoE target device, the computer executable instructions comprising instructions for:
   sending, to one or more FCoE forwarders and one or more target devices in the lossless Ethernet, discovery solicitation messages for acquiring Media Access Control (MAC) addresses of the FCoE forwarders and the target devices;
   receiving, from one or more of the FCoE forwarders and one or more of the target devices, discovery advertisement messages in response to the discovery solicitation messages, wherein one of the discovery advertisement messages sent from the first target device includes a first MAC address of the first target device;
   sending, to a name server, a message including a World Wide Name (WWN) identifier of the first target device for acquiring identifier information of the first target device;
   receiving, from the name server, an answer message carrying the identifier information of the first target device;
   determining that the identifier information matches with at least a portion of the first MAC address of the first target device; and
   performing, a login operation to establish the FCoE connection with the first target device according to the first MAC address.

6. The computer program product of claim 5, wherein the identifier information is information about an N_Port_ID of the first target device.

7. The computer program product of claim 5, the computer executable instructions further comprising instructions for:
   sending a message for obtaining a local MAC address to one of the FCoE forwarders; and
   receiving the local MAC address assigned by the FCoE forwarder.

8. The computer program product of claim 5, the computer executable instructions further comprising instructions for:
   sending a message for obtaining a local MAC address to one of the target devices; and
   receiving the local MAC address assigned by the FCoE forwarders.

* * * * *